United States Patent
Oroskar et al.

(10) Patent No.: US 10,314,051 B1
(45) Date of Patent: Jun. 4, 2019

(54) CONTROL OF UE VOICE CALL COMMUNICATION MODE BASED ON AIR INTERFACE LOAD IN VIEW OF TDD FRAME CONFIGURATION

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/615,426

(22) Filed: Jun. 6, 2017

(51) Int. Cl.
*H04W 72/08* (2009.01)
*H04L 5/14* (2006.01)
*H04L 1/00* (2006.01)
*H04B 1/707* (2011.01)
*H04W 24/02* (2009.01)
*H04W 72/04* (2009.01)

(52) U.S. Cl.
CPC .......... *H04W 72/082* (2013.01); *H04B 1/707* (2013.01); *H04L 1/0071* (2013.01); *H04L 5/14* (2013.01); *H04W 24/02* (2013.01); *H04W 72/0426* (2013.01)

(58) Field of Classification Search
None
See application file for complete search history.

(56) References Cited

U.S. PATENT DOCUMENTS

| | | | |
|---|---|---|---|
| 2012/0082070 A1* | 4/2012 | Hart | H04J 11/0023 370/280 |
| 2013/0163543 A1* | 6/2013 | Freda | H04W 72/0406 370/329 |
| 2015/0131619 A1 | 5/2015 | Zhu et al. | |
| 2016/0050653 A1* | 2/2016 | Rastogi | H04W 72/0406 455/453 |
| 2016/0344572 A1 | 11/2016 | Brust et al. | |

* cited by examiner

*Primary Examiner* — Alex Skripnikov

(57) ABSTRACT

In a wireless system in which a base station provides a time division duplex (TDD) air interface having a TDD frame configuration, a method and system for controlling whether a user equipment device (UE) operates in a first mode in which the UE sets up and engages in voice call communication via the base station or rather operates in a second mode in which the UE tunes away from the base station to set up and engage in voice call communication via another base station, such as under a different air interface protocol. The method involves determining whether traffic demand for the air interface exceeds a threshold level, and if so, causing the UE to operate in the second mode rather than in the first mode. Further, the method involves setting the threshold level based on the TDD frame configuration of the air interface.

20 Claims, 4 Drawing Sheets

CONTROL OF UE VOICE CALL COMMUNICATION MODE BASED ON AIR INTERFACE LOAD IN VIEW OF TDD FRAME CONFIGURATION

BACKGROUND

A typical wireless communication system includes one or more base stations, each providing one or more coverage areas or cells in which to serve user equipment devices (UEs) such as cell phones, tablet computers, tracking devices, embedded wireless modules, and other wirelessly equipped devices, whether or not user operated. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

Such a system may operate in accordance with a particular air interface protocol, with communications from a base station to UEs defining a downlink or forward link and communications from the UEs to the base station defining an uplink or reverse link. Examples of existing air interface protocols include, without limitation, Long Term Evolution (LTE) (using Orthogonal Frequency Division Multiple Access (OFDMA) on the downlink and Single Carrier Frequency Division Multiple Access (SC-FDMA) on the uplink), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handover between cells, and other functions related to air interface communication.

Under the air interface protocol, each base station coverage area may operate on a carrier, which could be either frequency division duplex (FDD) or time division duplex (TDD). An FDD carrier defines separate frequency channels for downlink and uplink communication, so that UEs can engage in downlink and uplink communication concurrently. Whereas, a TDD carrier defines a single frequency channel multiplexed over time between downlink and uplink use, so that UEs can engage in downlink communication in only particular time intervals and uplink communication in only other time intervals.

Further, each carrier in such a system could define a number of sub-channels for carrying information between the base station and UEs. For instance, each carrier could define a reference channel on which the base station broadcasts a reference signal that UEs can evaluate to determine coverage quality. And each carrier may define various other downlink and uplink control channels and traffic channels for carrying control signal and bearer traffic (e.g., application-layer traffic) between the base station and UEs.

When a UE initially enters into coverage of such a system, the UE may scan for a strongest coverage area. The UE may then read system information broadcast from the base station that provides that coverage area and may engage in a process to register for service by the base station and generally by the system. For instance, the UE and base station may engage in signaling to establish a radio-link-layer connection, the UE may transmit an attach request, and the base station and/or supporting infrastructure may authenticate and authorize the UE for service and establish a record indicating where in the system the UE is operating. The UE may then be served by the base station.

Overview

In a system that supports TDD operation, each coverage area that operates on a TDD carrier would be configured with a specific recurring sequence of downlink and uplink time segments defining a TDD configuration. By way of example, an LTE cell operating on a TDD carrier defines a continuum of 10-millisecond frames each divided into ten 1-millisecond subframes and has a TDD configuration that defines which of the subframes per frame are for downlink communication and which of the subframes per frame are for uplink communication. (Further, the TDD configuration could also designate certain subframes per frame as transitional or "special" subframes to facilitate transition from downlink to uplink communication.)

One unfortunate issue with multiplexing downlink and uplink subframes in this manner is that it can limit air interface capacity, since neither downlink nor uplink communication could occur in every subframe of a frame. Further, certain TDD configurations provide fewer uplink subframes than downlink subframes, which could further limit uplink air interface capacity.

In some systems, this capacity limitation could be offset in part by defining wider carrier frequency bandwidth so as to support a greater extent of data communication per subframe. However, even with wider carrier bandwidth, the TDD arrangement could create a capacity constraint, which could lead to user experience issues. For example, when the coverage area has extensive traffic (signaling and/or bearer data) to transmit, the limited capacity resulting from the TDD configuration could lead to delayed or blocked communications. Moreover, this could be a particular issue for latency-sensitive communications such as voice calls.

To help address this issue, a base station could be configured to detect when the traffic demand for its air interface exceeds a threshold level and to then responsively cause one or more of its served UEs to avoid engaging in voice call communication on the air interface. By way of example, the base station could be configured to respond to threshold high level of traffic demand for its air interface by directing one or more of its served UEs to switch from a mode in which the UE is configured to set up and engage in voice call communication via the base station to a mode in which the UE is instead configured to set up and engage in voice call communication via another base station.

This process could work well in an LTE system, where LTE base stations are co-located with legacy network (e.g., CDMA or GSM) base stations, and where UEs served by an LTE base station are capable of operating selectively in either a voice-over-LTE (VoLTE) mode or a Single Radio LTE (SRLTE) mode. In VoLTE mode, such a UE would be configured to engage in packet-based voice call communication via the LTE base station. Whereas, in SRLTE mode, the UE would be configured to tune away from the LTE base station to a legacy network base station to engage in voice call communication. In such an arrangement, the LTE base station could detect a threshold high level of traffic demand for its air interface and could responsively cause one or more of its served UEs to switch from operating in VoLTE mode to operating in SRLTE mode. Advantageously, doing so could help avoid having voice call communication by such UEs be impacted by heavy load on the LTE base station's air interface.

Whether in LTE or another type of system, the base station's evaluation of traffic demand for its air interface could address the question of whether the level of traffic demand exceeds a particular threshold level. Further, this threshold level could be set based on the TDD configuration of the air interface. In particular, considering that certain TDD configurations have fewer uplink subframes than others, the threshold level could be set to a lower level (more readily triggering action) for a TDD configuration that has fewer uplink subframes. For instance, if the TDD configuration has four uplink subframes per frame, the threshold level could be set to a first level, and if the TDD configuration has just two uplink subframes per frame, the threshold level could be set to a second level that is lower than the first level.

Accordingly, disclosed herein is a method operable by a first base station that provides a first air interface, the first air interface being TDD and having a TDD frame configuration. The method includes the first base station serving, via the first air interface, a UE that has two mutually-exclusive modes for setting up and engaging in voice call communication, a first mode in which the UE sets up and engages in voice call communication via the first base station and first air interface, and a second mode in which the UE tunes away from the first base station to a second base station that provides a second air interface and the UE sets up and engages in voice call communication via the second base station and second air interface. Further, the method includes the first base station controlling which of the first and second modes the UE operates in, with the controlling being based at least on a determination of whether traffic demand for the first air interface exceeds a threshold level. And the method includes setting the threshold level based on the TDD frame configuration of the air interface.

Further, in another respect, disclosed is a method for controlling whether a UE engages in voice call communication via a first air interface or rather via a second air interface, the first air interface being TDD and having a TDD frame configuration. The method includes making a determination of whether traffic demand for the first air interface exceeds a threshold level. Further, the method includes using the determination as a basis to control whether the UE engages in voice call communication via the first air interface or rather via the second air interface. In particular, the method includes (i) if the determination is that traffic demand for the first air interface does not exceed the threshold level, then causing the UE to operate in a mode in which the UE engages in voice call communication via the first air interface and (ii) if the determination is that traffic demand for the first air interface exceeds the threshold level, then causing the UE to operate in a mode in which the UE engages in voice call communication via the second air interface. And still further, the method includes setting the threshold level based on the TDD frame configuration of the first air interface.

Yet further, in another respect, disclosed is a first base station configured to control operation of a UE served by the first base station. The first base station includes wireless communication components, including a radio, a power amplifier, and an antenna structure, for providing an air interface, the air interface being TDD and having a TDD frame configuration. Further the first base station includes a controller for controlling operation of the UE when the UE is served by the first base station via the air interface. In particular, the controller is configured to (i) make a determination of whether traffic demand for the air interface exceeds a threshold level and (ii) based on the determination, control whether the UE operates in a first mode in which the UE is configured to set up and engage in voice call communication via the first base station or rather in a second mode in which the UE is configured to tune away from the first base station to a second base station to set up and engage in voice call communication. And the controller is further configured to set the threshold level based on the TDD frame configuration of the air interface.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Features of the present disclosure will be described by way of example in the context of LTE and CDMA. However, it will be understood that principles of the disclosure can extend to apply in other scenarios as well, such as with respect to other air interface protocols. Further, numerous variations from the details disclosed may be possible. For instance, elements, arrangements, and operations may be added, removed, combined, distributed, or otherwise modified. In addition, operations described as being performed by one or more entities may be implemented in various ways, such as by a processing unit executing program instructions for instance.

Figure 1:
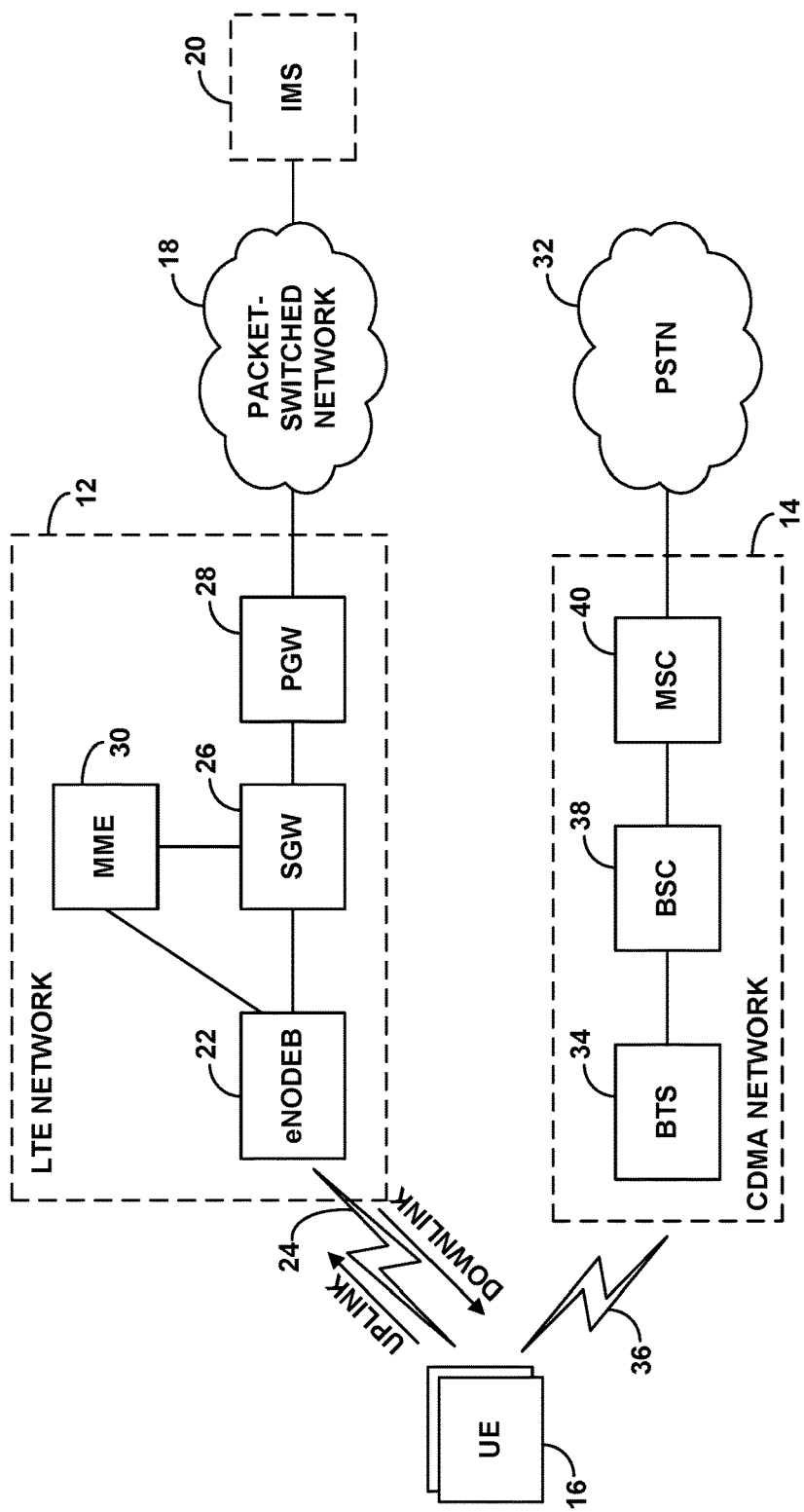
FIG. 1 is a simplified block diagram of an example communication system in which features of the present disclosure can be implemented.

As noted above, FIG. 1 is a simplified block diagram of an example communication system in which features of the present disclosure can be implemented. In particular, FIG. 1 depicts an example LTE network 12 and an example CDMA network 14, each providing coverage in which to serve UEs 16.

As a general matter, the LTE network 12 provides UEs with access to communicate on a packet-switched network 18, in order to facilitate packet-data communication service including but not limited to voice over Internet Protocol (VoIP) communication service. For instance, a UE could attach with the LTE network and obtain an Internet Protocol (IP) address on packet-switched network 18 and could then engage in IP communication with various remote entities. For voice call communication, for instance, the UE could communicate with an Internet Multimedia Subsystem (IMS) 20, to set up and engage in VoIP calls.

LTE network 12 is shown including a representative LTE base station (eNodeB) 22, which provides a coverage area defining an LTE air interface 24 in which to serve UEs 16. The eNodeB 22 is then shown having a communication interface with a serving gateway (SGW) 26, which has a communication interface with a packet data network gateway (PGW) 28, which provides connectivity with packet-switched network 18. Further, the eNodeB also has a communication interface with a mobility management entity (MME) 30, which a communication interface with SGW 26.

In an example implementation, LTE air interface 24 operates on a TDD carrier that has a defined frequency bandwidth within a particular band. For example, the TDD carrier could have a 20 MHz bandwidth and could reside within LTE Band 41 (2496-2690 MHz), or the carrier could take other forms or be located within other bands. LTE air interface 20 then defines a downlink and an uplink, multiplexed over time in accordance with a TDD configuration of the air interface.

Pursuant to LTE, as noted above, the LTE air interface 20 is divided over time into a continuum of 10-millisecond frames each made up of ten 1-millisecond subframes, and the TDD configuration designates each subframe as either a downlink subframe, an uplink subframe, or a special (transitional) subframe. Further, each subframe is divided over time into 66.7 microsecond symbol time segments, and the carrier bandwidth is divided over frequency into 15 kHz subcarriers. Thus, the air interface in each subframe effectively defines an array of resource elements, each spanning 66.7 microseconds and occupying a 15 kHz subcarrier, and each such resource element could be used to carry modulated data.

The LTE air interface then defines particular channels made up of groups of these resource elements. For instance, on the downlink, certain resource elements are reserved to define a downlink control region for carrying scheduling directives and other control signaling, other resource elements are reserved to define a downlink shared-channel region for carrying scheduled downlink communications, and still other resource elements are reserve for other purposes. And on the uplink, certain resource elements are reserved to define an uplink control region for carrying scheduling requests and other control signaling, other resource elements are reserved to define an uplink shared-channel region for carrying scheduled uplink communication, and still other resources are reserved for other purposes.

When a UE enters into coverage of eNodeB 22, the UE may engage in Radio Resource Control (RRC) signaling with the eNodeB to establish a radio-link-layer connection and may then engage in attach signaling with the MME via that connection. And after the MME authenticates the UE, the MME may then coordinate setup of one or more bearer tunnels between the UE and the PSG, for carrying IP communication between the UE and the packet-switched network 18. For instance, the MME could coordinate setup of a general bearer for carrying general Internet communications to and from the UE. And the MME could further coordinate setup of an IMS signaling bearer for carrying voice call setup signaling, such as Session Initiation Protocol (SIP) signaling, between the UE and the IMS. Further, the UE could register with the IMS to engage in VoLTE service.

Once so attached, the eNodeB 22 may then serve the UE in a connected mode, in which the eNodeB coordinates shared channel transmissions to and from the UE. For instance, when the eNodeB receives packet data for transmission to the UE, the eNodeB could assign downlink shared-channel resources to carry the data to the UE, could transmit a downlink control message to the UE specifying the assigned resources, and could transmit the data to the UE in the assigned resources. And when the UE has packet data to transmit, the UE could send a scheduling request to the eNodeB, the eNodeB could assign uplink shared-channel resources to carry the data from the UE and could transmit a downlink control message to the UE specifying the assigned resources, and the UE could transmit the data to the eNodeB.

Further, when no data has flowed over the UE's radio-link-layer connection for a defined period of time, the eNodeB may release the UE's radio-link-layer connection, transmitting to the UE a RRC connection release message, thus transitioning the UE to an idle mode. In the idle mode, if the UE has data to transmit, the UE could engage in signaling with the eNodeB to newly establish a radio-link-layer connection and could then transmit the data as noted above. And likewise, if LTE network has data to transmit to an idle UE, the eNodeB could page the UE and the UE could similarly engage in signaling with the eNodeB to establish a radio-link-layer connection, and the eNodeB could then transmit the data to the UE as noted above.

In addition, in an example implementation, the eNodeB and UE could apply a Hybrid Automatic Repeat Request (HARQ) process to help ensure successful air interface transmission of data to and from the UE. Under such a process, when data is transmitted over the air interface between the eNodeB and the UE, the receiving end would determine whether the data is received successfully and would then send to the transmitting end either a negative-acknowledgement (NACK) or a positive-acknowledgement (ACK). If the receiving end sends a NACK, then the transmitting end would engage in HARQ retransmission, re-sending the data possibly with some varied error-correction bits to help recovery. Whereas if the receiving end sends an ACK, then the transmitting end could proceed to send next data if any.

With this LTE arrangement, the eNodeB 22 may serve potentially many UEs on air interface 24 at any given time, with each UE having an established radio-link-layer connection and engaging in packet-data communication with the eNodeB. For example, the eNodeB may serve UEs engaging in general Internet communications, such as web browsing, messaging, file transfer, media streaming, and the like. Further, the eNodeB may serve UEs engaging in VoLTE call service, with UEs engaging in SIP signaling with the IMS to set up VoIP calls and then exchanging packetized voice data with the IMS and/or with one or more other entities.

Moreover, with recent developments related to the "Internet of Things," the eNodeB may serve a great number of Machine-Type-Communication (MTC) devices at any given time as well. These UEs could be embedded wireless modules configured to facilitate communication between machines, possibly without human interaction, for various purposes such as security, tracking, payment, health, remote maintenance and control, metering, consumer device control, and the like. Consequently, the eNodeB may at times face especially high traffic demand for its air interface.

In the arrangement of FIG. 1, on the other hand, CDMA network 14 operates primarily to provide UEs with access to communicate on the PSTN 32, to engage in traditional circuit-switched voice call communication (as well as associated services, such as SMS text messaging and the like). For instance, a UE could register with the CDMA network and could then place and receive calls on the PSTN via the CDMA network. The CDMA network may also provide packet-data communication service, through use of a network access gateway (not shown) that provides connectivity with a packet-switched network such as network 18 for instance.

CDMA network 14 is shown including a representative CDMA base station (base transceiver station (BTS)) 34, which provides a coverage area defining an CDMA air interface 36 in which to serve UEs. The BTS 34 is then shown having a communication interface with a base station controller (BSC) 38, which has a communication interface with a mobile switching center (MSC) 40, which provides connectivity with the PSTN 32.

In example implementation, when a UE enters into coverage of BTS 34, the UE could send a registration request to the BTS, which the BTS and BSC could forward to the MSC. After authenticating the UE, the MSC or BSC could then direct the BTS to assign an air interface traffic channel for use by the UE. Further, after a period of no communication on that channel, the BTS could release the channel and the UE could operate in an idle or dormant mode, in which the UE could periodically monitor for page messages for incoming calls.

In operation with this arrangement, the UE could place a voiced call by transmitting a call origination request to the BTS, in response to which the MSC could set up and connect the call over the PSTN. And if the MSC receives an incoming call to connect to the UE, the BTS could page the UE and, upon UE response, could assign a traffic channel for carrying the call, and the MSC could connect the call through to the UE.

In practice, the LTE network 12 of FIG. 1 could be established as an overlay to the CDMA network, with its coverage area 24 at least partially overlapping with the coverage area 36 of the CDMA network 14. With such an arrangement, UEs 16 could operate concurrently within coverage of both the LTE network and the CDMA network. Of these UEs, those that engage in only packet-data communication, such as MTC devices for instance, could attach with the LTE network and disregard the CDMA network Whereas, UEs that are capable of engaging both VoLTE call communication service and CDMA call communication service could operate in either a VoLTE mode or an SRLTE mode (among other possibilities, such as Circuit-Switched-Fallback (CSFB) mode if available).

When operating in VoLTE mode, a UE could be attached with the LTE network and not registered with the CDMA network, and the UE could be configured such that it would set up and engage in any voice calls via the LTE network. In particular, in this mode, when the UE has a voice call to place, the UE could engage in SIP signaling with the IMS to set up the voice call including a voice-over-packet call leg between the UE and the UE, the LTE network could responsively establish a VoLTE bearer for carrying voice data of the call, and the UE could engage in the call. In this process, the SIP signaling and voice data would flow over the LTE air interface 24, scheduled by the eNodeB 22 as appropriate.

When operating in SRLTE mode, on the other hand, the a UE could attach by default with the LTE network but could also tune away temporarily from LTE to CDMA to register with the CDMA network as well. The UE could then operate by default with LTE service, benefitting from the high data rates offered by LTE. But the UE could tune away temporarily from LTE to CDMA when appropriate to check for, set up, and/or engage in voice calls. In particular, the UE could tune away periodically from LTE to CDMA to check for any CDMA page messages, and upon receiving a CDMA page message for an incoming voice call, could then engage in further signaling via CDMA to set up and engage in the call via the CDMA network. Further, when the UE has a voice call to place, the UE could likewise tune away from LTE to CDMA and initiate the call via the CDMA network. SRLTE could thus advantageously offload voice call communications from LTE air interface 24 to the CDMA air interface 36.

A representative UE that supports both VoLTE mode and SRLTE mode might be configured by default to operate in VoLTE mode. For instance, the UE could be so provisioned at the time of manufacture, or the eNodeB might direct the UE to operate in VoLTE mode by transmitting to the UE an RRC control message directing the UE to do so and/or by broadcasting a system parameter message that directs such UEs to do so.

In accordance with the disclosure, the eNodeB could then monitor the traffic demand for its air interface 24 and, upon detecting that the traffic demand exceeds a threshold level, responsively cause one or more such UEs to transition from operating in VoLTE mode to operating in SRLTE mode, so as to help avoid or address issues like those noted above. For instance, upon detecting that the traffic demand exceeds the threshold level, the eNodeB could identify each of one or more of its served UEs that is both VoLTE capable and SRLTE capable (e.g., based on UE service profile data), and the eNodeB could direct each such UE to transition to operating in SRLTE mode, such as by transmitting to the UE an RRC control message directing the UE to do so and/or by broadcasting a system parameter message that directs each such UE to do so.

When a UE is served by the eNodeB and is operating in VoLTE mode and the UE receives a directive from the eNodeB for the UE to transition from VoLTE mode to SRLTE mode, the UE could responsively make that transition by deregistering from the IMS and registering with the CDMA network and then operating in SRLTE mode as discussed above. For instance, the UE could transmit a de-registration message via the LTE network to the IMS to deregister from the IMS. And the UE could temporarily tune away from LTE to CDMA and register with the CDMA network, and then return to LTE. Alternatively, the UE could responsively make the transition by temporarily tuning away from LTE to CDMA to register with the CDMA network, and the MSC could signal to the IMS to deregister the UE from the IMS. In either case, the UE could then operate by default with LTE service but could tune away from LTE to CDMA to check for, set up, and/or engage in any voice calls as discussed above.

In a scenario where the UE is being served by the eNodeB in a connected mode and the eNodeB is going to cause that UE to transition from operating in VoLTE mode to operating in SRLTE mode, the eNodeB could wait until the UE is transitioning from connected mode to idle mode and could include within its RRC connection release message to the UE a command to which the UE will respond by transitioning from VoLTE mode to SRLTE mode.

Further, in this or other command, the eNodeB could direct the UE to make the transition from VoLTE to SRLTE for a defined period of time, such as a particular number of seconds. And the UE could accordingly make the transition for that specified time period and then automatically revert from operating in SRLTE mode to operating in VoLTE mode.

In this process, the eNodeB could monitor and evaluate traffic demand for its air interface 24 in various ways. By way of example, the eNodeB could regularly track traffic demand in terms of the quantity of UEs that the eNodeB is currently serving, perhaps those that it is currently serving in connected mode. Further, given the chance that eNodeBs may serve many MTC devices and that such service could contribute to overloading an eNodeB's air interface, the eNodeB's measure of traffic demand could be based on how many MTC devices the eNodeB is currently serving on air interface 24, such as how many MTC devices have a radio-link-layer connection with the eNodeB on that air interface. Thus, the eNodeB could deem the traffic demand to be higher as the eNodeB is serving more MTC devices on the air interface, and vice versa.

As another example, the eNodeB could track traffic demand in terms of the extent to which HARQ retransmissions have been necessary for UEs served by the eNodeB. For instance, the eNodeB could track the rate of HARQ retransmissions (e.g., HARQ retransmission requests) on a recent sliding window basis, which could be indicative of likely or expected extent of HARQ retransmissions moving forward. And the eNodeB could deem the traffic demand to be higher when the rate of HARQ retransmissions is higher, and vice versa.

Still further, as another example, the eNodeB could track the extent of control signaling on air interface 24, also possibly over a recent sliding window basis, which could be indicative of the likely or expected extent of control signaling moving forward. And the eNodeB could deem the traffic demand to be higher when the extent of control signaling is higher, and vice versa. Other example traffic-demand metrics could be possible as well. Further, various metrics could be considered in combination.

As further discussed above, the eNodeB could decide when to cause one or more UEs to transition from VoLTE mode to SRLTE mode based on when the traffic demand for the air interface 24 exceeds (e.g., is greater than, or is equal to or greater than) a threshold level. In particular, the eNodeB could regularly compare its latest determined level of traffic demand with a threshold level to determine whether the traffic demand exceeds the threshold level, and could select VoLTE mode or SRLTE mode and cause one or more UEs to operate accordingly. Namely, if the determination is that the traffic demand does not exceed the threshold level, then the eNodeB could select VoLTE mode and thus cause one or more of its served UEs to operate in VoLTE mode by directing them to do so or by responsively not taking action to have them operate in SRLTE mode. Whereas, if the determination is that the traffic demand exceeds the threshold level, then the eNodeB could select SRLTE mode and thus cause one or more of its served UEs to transition from operating in VoLTE mode to operating in SRLTE mode as discussed above.

The threshold level that the eNodeB considers for this purpose could be set to a value that is deemed to represent such high traffic demand that issues such as those noted above might arise.

Moreover, in line with the discussion above, the threshold level that the eNodeB uses for this purpose could be set particularly based on the TDD configuration of air interface 24. In particular, the eNodeB could maintain and reference a table that maps each of various TDD configurations with a respective traffic-demand threshold. In line with the discussion above, such a table could define a lower traffic-demand threshold for TDD configurations that have fewer uplink subframes, and vice versa. For instance, TDD LTE standard frame configuration #1 has four uplink subframes, and TDD LTE standard frame configuration #2 has two uplink subframes. The table could thus specify a lower traffic-demand threshold for frame configuration #2 than for frame configuration #1, because frame configuration #2 has fewer uplink subframes than frame configuration #1. Other examples are possible as well.

In practice, the TDD configuration of air interface 24 might be set by engineering input or through automated processes, such as dynamically on a schedule or other basis (e.g., to be a TDD configuration that has more uplink subframes at times of day when the eNodeB tends to serve more uplink communication, or the like). And the eNodeB could specify the TDD configuration in a broadcast system parameter message, so that served UEs could determine what the TDD configuration is and could operate accordingly.

When the TDD configuration of air interface 24 is initially set or changed, the eNodeB could thus establish from a table such as that noted above what threshold level to apply when evaluating traffic demand, and the eNodeB could apply that threshold level. Further, when the TDD configuration of air interface 24 changes, the eNodeB could then correspondingly change the threshold level that the eNodeB applies when evaluating traffic demand. Thus, the threshold level could change in correspondence with a change in the TDD configuration of the air interface.

Figure 2:
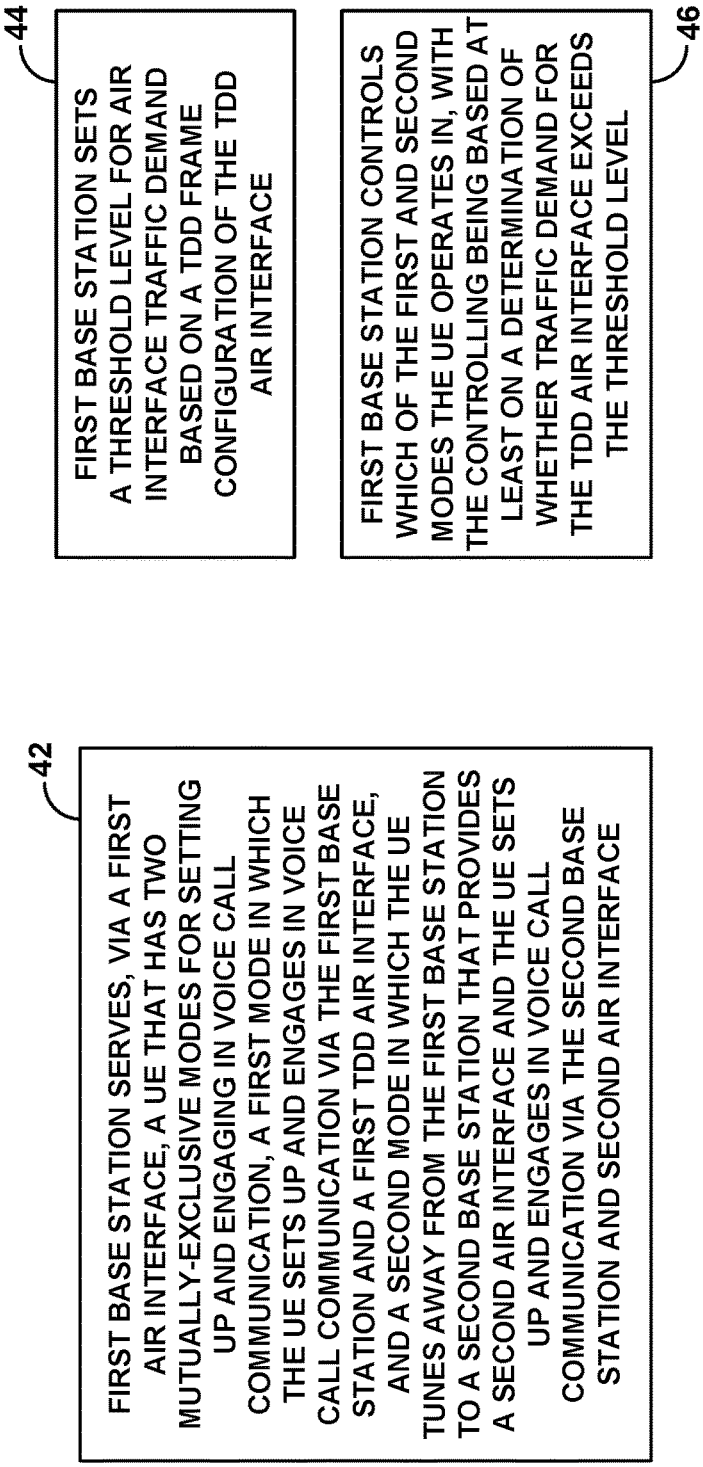
FIG. 2 is a depiction of operations that can be carried out in accordance with the disclosure.

FIG. 2 is next a depiction of operations that can be carried out in accordance with the above discussion. These operations could be carried out by a base station such as eNodeB for instance, which could be considered a first base station, where the first base station provides a first air interface, the first air interface being TDD and having a TDD frame configuration. Further, the operations are shown without connecting arrows, as the operations could be carried out as concurrent threads or in various orders.

As shown in FIG. 2, at block 42, the first base station serves, via the first air interface, a UE that has two mutually-exclusive modes for setting up and engaging in voice call communication, a first mode in which the UE sets up and engages in voice call communication via the first base station and first air interface, and a second mode in which the UE tunes away from the first base station to a second base station that provides a second air interface and the UE sets up and engages in voice call communication via the second base station and second air interface. Further, at block 44, the first base station sets a threshold level for air interface traffic demand based on the TDD frame configuration of the first air interface. And at block 46, the first base station controls which of the first and second modes the UE operates in, with the controlling being based at least on a determination of whether traffic demand for the first air interface exceeds the set threshold level. And at block 46, the first base station sets the threshold level based on the TDD frame configuration of the first air interface.

In line with the discussion above, the voice call communication via the first base station could include voice-over-packet communication, and the voice call communication via the second base station could comprise voice-over-circuit communication.

Further, as discussed above, the act of controlling which of the first mode and second modes the UE operates in could involve making the determination of whether traffic demand for the first air interface exceeds the threshold level, selecting one of the modes based at least on the determination (along with possibly one or more other factors), and wirelessly transmitting a control signal (e.g., an RRC release message) to which the UE is configured to respond by operating in the selected mode.

Still further, as discussed above, the traffic demand for the first air interface could be based on various factors, including, for instance, a quantity of MTC devices currently served by the first base station on the first air interface, a rate of HARQ retransmission requests on the first air interface, and/or a level of control channel traffic on the first air interface.

And yet further, the act of setting the threshold level based on the TDD frame configuration of the first air interface could involve setting the threshold level based on how many uplink subframes the TDD frame configuration has per frame, and could further involve changing the threshold level in correspondence with a change of the TDD frame configuration of the first air interface.

Figure 3:
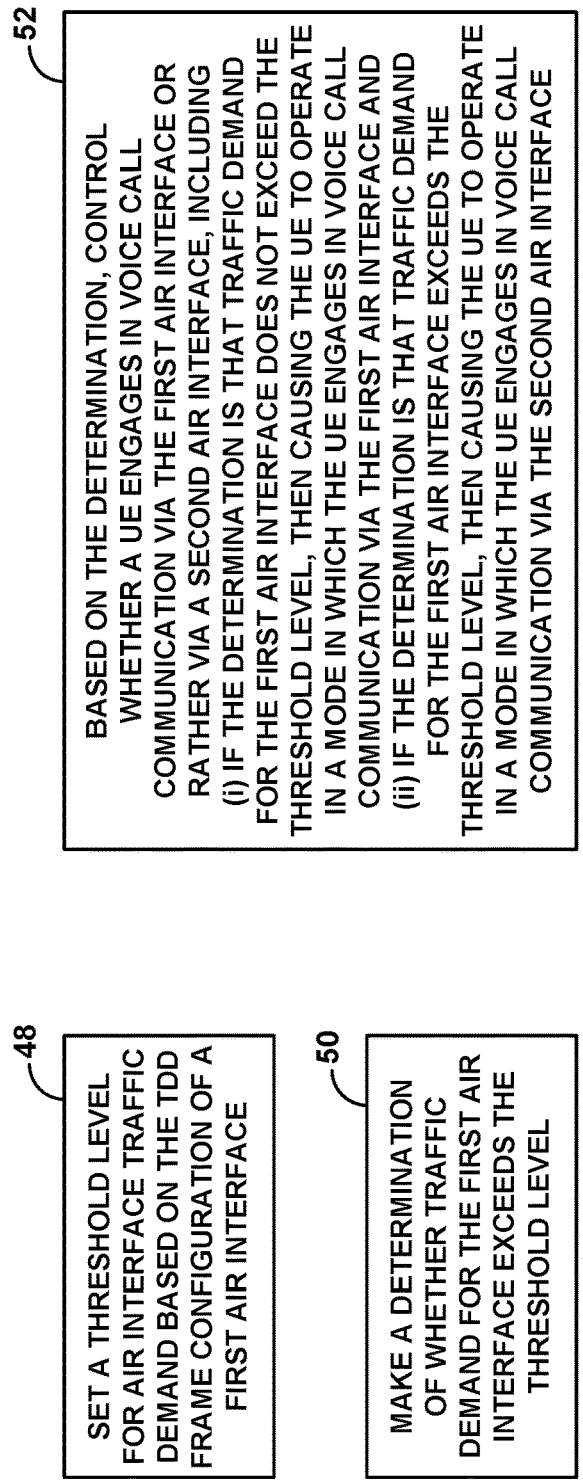
FIG. 3 is another depiction of operations that can be carried out in accordance with the disclosure.

FIG. 3 is next another depiction of operations that can be carried out in accordance with the above discussion, to control whether a UE engages in voice call communication (e.g., is set to engage in voice call communication) via a first air interface or rather via a second air interface, where the first air interface is TDD and has a TDD frame configuration. These operations could likewise be carried out by a base station such as eNodeB for instance.

As shown in FIG. 3, at block 48, the operations include setting threshold level for air interface traffic demand based on the TDD frame configuration of the first air interface. Further, at block 50, the operations include making a determination of whether traffic demand for the first air interface exceeds the threshold level. And at block 52, the method involves, based on the determination, controlling whether the UE engages in voice call communication via the first air interface or rather via the second air interface, including (i) if the determination is that traffic demand for the first air interface does not exceed the threshold level, then causing the UE to operate in a mode in which the UE engages in voice call communication via the first air interface and (ii) if the determination is that traffic demand for the first air interface exceeds the threshold level, then causing the UE to operate in a mode in which the UE engages in voice call communication via the second air interface. And at block 52, the method involves setting the threshold level based on the TDD frame configuration of the first air interface.

Features discussed above can be applied in this context as well, and vice versa. For instance, voice call communication via the first air interface station could include voice-over-packet communication, and voice call communication via the second air interface could include voice-over-circuit communication. Further, traffic demand could be gauged based on metrics such as those noted above. And the threshold level could be set based on how many uplink subframes the TDD frame configuration has per frame and could be changed in correspondence with a change of the TDD frame configuration of the first air interface.

Figure 4:
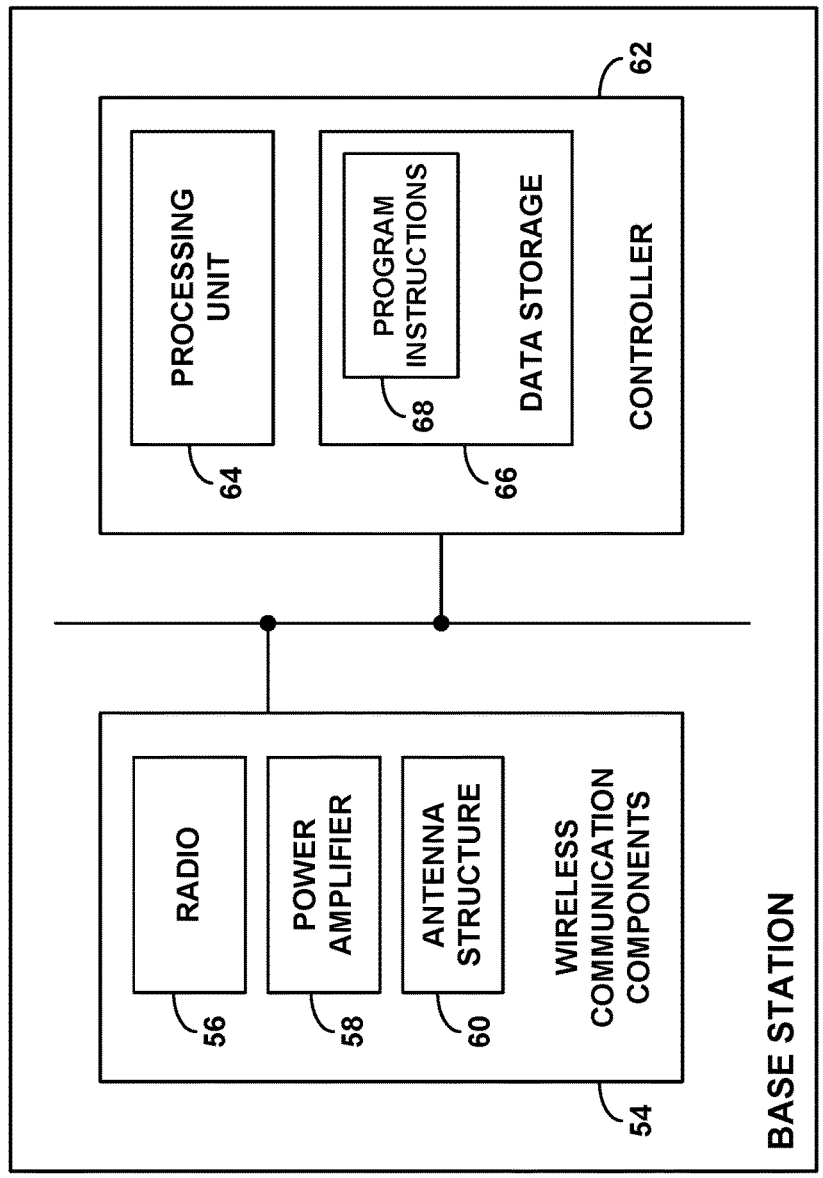
FIG. 4 is a simplified block diagram of a base station operable in accordance with the disclosure.

Finally, FIG. 4 is a simplified block diagram of a base station that could be configured to operate in accordance with the present disclosure, to control operation of a UE served by the base station. As with the discussion, the base station could be considered a first base station. Further, the various components shown in FIG. 4 could be integrated or communicatively linked together in various ways.

As shown in FIG. 4, the first base station includes wireless communication components 54, such as a radio 56, a power amplifier 58, and an antenna structure 60, cooperatively configured to provide an TDD air interface having a TDD frame configuration. Further, the first base station includes a controller 62, such as one or more processing units (e.g., microprocessors or other processors) 64, data storage 66, and program instructions 68 stored in the data storage and executable by the processing unit(s), for controlling operation of the UE when the UE is served by the first base station via the air interface, as discussed above.

In line with the discussion above, the controller could be configured to (i) make a determination of whether traffic demand for the air interface exceeds a threshold level and (ii) based on the determination, control whether the UE operates in a first mode in which the UE is configured to set up and engage in voice call communication via the first base station or rather in a second mode in which the UE is configured to tune away from the first base station to a second base station to set up and engage in voice call communication. Further, the controller could be configured to set the threshold level based on the TDD frame configuration of the air interface.

Moreover, features discussed above can be applied in this context as well, and vice versa.

Exemplary embodiments have been described above. Those skilled in the art will understand, however, that changes and modifications may be made to these embodiments without departing from the true scope and spirit of the invention. For example, although the above discussion provides for a base station carrying out various described features, certain features could be carried out by one or more other entities on behalf of the base station or instead of the base station. Other examples are possible as well.

We claim:

1. A method operable by a first base station that provides a first air interface, the first air interface being time division duplex (TDD) and having a TDD frame configuration, the method comprising:

serving by the first base station, via the first air interface, a user equipment device (UE) that has two mutually-exclusive modes for setting up and engaging in voice call communication, a first mode in which the UE sets up and engages in voice call communication via the first base station and first air interface, and a second mode in which the UE tunes away from the first base station to a second base station that provides a second air interface and the UE sets up and engages in voice call communication via the second base station and second air interface;

controlling by the first base station which of the first and second modes the UE operates in, wherein the controlling is based at least on a determination of whether traffic demand for the first air interface exceeds a threshold level; and setting the threshold level based on the TDD frame configuration of the first air interface.

2. The method of claim 1, wherein voice call communication via the first base station comprises voice-over-packet communication, and voice call communication via the second base station comprises voice-over-circuit communication.

3. The method of claim 1, wherein controlling which of the first mode and second modes the UE operates in comprises:

making the determination of whether traffic demand for the first air interface exceeds the threshold level;

based at least on the determination, selecting one of the first mode and the second mode; and wirelessly transmitting a control signal to which the UE is configured to respond by operating in the selected mode.

4. The method of claim 3, wherein the control signal comprises a directive within a Radio Resource Control (RRC) release message to the UE.

5. The method of claim 3, wherein selecting one of the first mode and the second mode based on the determination comprises:

if the determination is that traffic demand on the first air interface does not exceed the threshold level, then selecting the first mode; and if the determination is that traffic demand on the first air interface exceeds the threshold level, then selecting the second mode.

6. The method of claim 1, wherein the traffic demand for the first air interface is based on a quantity of Machine-Type Communication (MTC) devices currently served by the first base station on the first air interface.

7. The method of claim 1, wherein the traffic demand for the first air interface is based on a rate of Hybrid Automatic Repeat Request (HARD) retransmission requests on the first air interface.

8. The method of claim 1, wherein the traffic demand for the first air interface is based on control channel traffic on the first air interface.

9. The method of claim 1, wherein setting the threshold level based on the TDD frame configuration of the first air interface comprises setting the threshold level based on how many uplink subframes the TDD frame configuration has per frame.

10. The method of claim 1, further comprising changing the threshold level in correspondence with a change of the TDD frame configuration of the first air interface.

11. A method for controlling whether a user equipment device (UE) engages in voice call communication via a first air interface or rather via a second air interface, the first air interface being time division duplex (TDD) and having a TDD frame configuration, the method comprising:

making a determination of whether traffic demand for the first air interface exceeds a threshold level;

based on the determination, controlling whether the UE engages in voice call communication via the first air interface or rather via the second air interface, including (i) if the determination is that traffic demand for the first air interface does not exceed the threshold level, then causing the UE to operate in a mode in which the UE engages in voice call communication via the first air interface and (ii) if the determination is that traffic demand for the first air interface exceeds the threshold level, then causing the UE to operate in a mode in which the UE engages in voice call communication via the second air interface; and setting the threshold level based on the TDD frame configuration of the first air interface.

12. The method of claim 11, wherein voice call communication via the first air interface station comprises voice-over-packet communication, and voice call communication via the second air interface comprises voice-over-circuit communication.

13. The method of claim 11, wherein the traffic demand on the first air interface is based on a quantity of Machine-Type Communication (MTC) devices currently served on the first air interface.

14. The method of claim 11, wherein the traffic demand on the first air interface is based on a rate of Hybrid Automatic Repeat Request (HARD) retransmission requests on the first air interface.

15. The method of claim 11, wherein setting the threshold level based on the TDD frame configuration of the first air interface comprises setting the threshold level based on how many uplink subframes the TDD frame configuration has per frame.

16. The method of claim 11, further comprising changing the threshold level in correspondence with a change of the TDD frame configuration of the first air interface.

17. A first base station configured to control operation of a user equipment device (UE) served by the first base station, the first base station comprising:

wireless communication components, including a radio, a power amplifier, and an antenna structure, for providing an air interface, wherein the air interface is time division duplex (TDD) and has a TDD frame configuration; and a controller for controlling operation of the UE when the UE is served by the first base station via the air interface, wherein the controller is configured to (i) make a determination of whether traffic demand for the air interface exceeds a threshold level and (ii) based on the determination, control whether the UE operates in a first mode in which the UE is configured to set up and engage in voice call communication via the first base station or rather in a second mode in which the UE is configured to tune away from the first base station to a second base station to set up and engage in voice call communication, and wherein the controller is further configured to set the threshold level based on the TDD frame configuration of the air interface.

18. The first base station of claim 17, wherein voice call communication via the first base station comprises voice-over-packet communication, and voice call communication via the second base station comprises voice-over-circuit communication.

19. The first base station of claim 17, wherein the traffic demand for the air interface is based on at least one measure selected from the group consisting of (i) a quantity of Machine-Type Communication (MTC) devices currently served by the first base station on the air interface, (ii) a rate of Hybrid Automatic Repeat Request (HARD) retransmission requests on the air interface, and (iii) a control channel traffic on the air interface.

20. The first base station of claim 17, wherein setting the threshold level based on the TDD frame configuration of the air interface comprises setting the threshold level based on how many uplink subframes the TDD frame configuration has per frame.

* * * * *